(12) United States Patent
Goldenberg et al.

(10) Patent No.: US 12,366,762 B2
(45) Date of Patent: *Jul. 22, 2025

(54) FOLDED CAMERA STRUCTURE WITH AN EXTENDED LIGHT- FOLDING-ELEMENT SCANNING RANGE

(71) Applicant: Corephotonics Ltd., Tel Aviv (IL)

(72) Inventors: Ephraim Goldenberg, Tel Aviv (IL); Gil Bachar, Tel Aviv (IL); Itay Jerby, Tel Aviv (IL); Itay Yedid, Tel Aviv (IL); Yonatan Mandel, Tel Aviv (IL); Gal Shabtay, Tel Aviv (IL); Noy Cohen, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/804,190

(22) Filed: Aug. 14, 2024

(65) Prior Publication Data

US 2024/0402511 A1    Dec. 5, 2024

Related U.S. Application Data

(63) Continuation of application No. 17/971,565, filed on Oct. 22, 2022, now Pat. No. 12,092,841, which is a
(Continued)

(51) Int. Cl.
*G02B 27/64* (2006.01)
*G02B 13/00* (2006.01)
(Continued)

(52) U.S. Cl.
CPC ......... *G02B 27/64* (2013.01); *G02B 13/0065* (2013.01); *H04N 23/58* (2023.01); *H04N 23/685* (2023.01)

(58) Field of Classification Search
CPC ... G02B 27/646; G02B 13/0065; G03B 17/17
See application file for complete search history.

(56) References Cited

U.S. PATENT DOCUMENTS 3,085,354 A    4/1963  Rasmussen et al.
3,584,513 A    6/1971  Gates
(Continued)

FOREIGN PATENT DOCUMENTS

CN    101276415 A    10/2008
CN    201514511 U    6/2010
(Continued)

OTHER PUBLICATIONS

FSM-300 User's Manual, Newport Corporation, Irvine, CA, 2014. https://www.newport.com/medias/sys_master/images/images/hbd/h22/8797100572702/FSM-300UserManual.pdf. Accessed 11, Sep. 2024. (Year: 2014).*
(Continued)

*Primary Examiner* — Noam Reisner
(74) *Attorney, Agent, or Firm* — Nathan & Associates; Menachem Nathan

(57) ABSTRACT

Voice coil motor (VCM) actuators for rotating an optical path folding element (OPFE) over an extended scanning range relative to a scanning/rotation range needed for optical image stabilization (OIS).

21 Claims, 10 Drawing Sheets

Related U.S. Application Data continuation of application No. 16/064,114, filed as application No. PCT/IB2017/057706 on Dec. 6, 2017, now Pat. No. 11,531,209.

(60) Provisional application No. 62/439,518, filed on Dec. 28, 2016.

(51) Int. Cl.
*H04N 23/58* (2023.01)
*H04N 23/68* (2023.01)

(56) References Cited

U.S. PATENT DOCUMENTS

| | | |
|---|---|---|
| 3,941,001 A | 3/1976 | LaSarge |
| 4,199,785 A | 4/1980 | McCullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,781,362 A * | 7/1998 | Bang ............ G11B 5/556 360/78.04 |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,341,901 B1 | 1/2002 | Iwasas et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 12,092,841 B2 * | 9/2024 | Goldenberg ............ H04N 23/58 |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |

(56) References Cited

U.S. PATENT DOCUMENTS

| | | |
|---|---|---|
| 2004/0061788 A1 | 4/2004 | Bateman |
| 2004/0141065 A1 | 7/2004 | Hara et al. |
| 2004/0141086 A1 | 7/2004 | Mihara |
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |

(56) References Cited

U.S. PATENT DOCUMENTS

| | | |
|---|---|---|
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0115466 A1 | 4/2017 | Murakami et al. |
| 2017/0124987 A1 | 5/2017 | Kim et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2017/0294002 A1 | 10/2017 | Jia et al. |
| 2017/0329111 A1 | 11/2017 | Hu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0095293 A1* | 4/2018 | Yeon .................. H02P 6/006 |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0198897 A1 | 7/2018 | Tang et al. |
| 2018/0216925 A1 | 8/2018 | Yasuda et al. |
| 2018/0241922 A1 | 8/2018 | Baldwin et al. |
| 2018/0249090 A1 | 8/2018 | Nakagawa et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0089941 A1 | 3/2019 | Bigioi et al. |
| 2019/0096047 A1 | 3/2019 | Ogasawara |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0297238 A1 | 9/2019 | Klosterman |
| 2019/0320119 A1 | 10/2019 | Miyoshi |
| 2020/0014912 A1 | 1/2020 | Kytsun et al. |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0208415 A1 | 7/2021 | Goldenberg et al. |
| 2021/0333521 A9 | 10/2021 | Yedid et al. |
| 2021/0368104 A1 | 11/2021 | Bian et al. |
| 2022/0252963 A1 | 8/2022 | Shabtay et al. |
| 2022/0368814 A1 | 11/2022 | Topliss et al. |

FOREIGN PATENT DOCUMENTS

| | | |
|---|---|---|
| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 203482298 U | 3/2014 |
| CN | 103841404 A | 6/2014 |
| CN | 204422947 U | 6/2015 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |

(56) References Cited

FOREIGN PATENT DOCUMENTS

| | | | |
|---|---|---|---|
| JP | 2006238325 | A | 9/2006 |
| JP | 2008083377 | A | 9/2006 |
| JP | 2007086808 | A | 4/2007 |
| JP | 2007228006 | A | 9/2007 |
| JP | 2007306282 | A | 11/2007 |
| JP | 2008076485 | A | 4/2008 |
| JP | 2008245142 | A | 10/2008 |
| JP | 2008271026 | A | 11/2008 |
| JP | 2010204341 | A | 9/2010 |
| JP | 2011055246 | A | 3/2011 |
| JP | 2011085666 | A | 4/2011 |
| JP | 2011138407 | A | 7/2011 |
| JP | 2011203283 | A | 10/2011 |
| JP | 2012132739 | A | 7/2012 |
| JP | 2013101213 | A | 5/2013 |
| JP | 2013106289 | A | 5/2013 |
| JP | 2016105577 | A | 6/2016 |
| JP | 2017146440 | A | 8/2017 |
| JP | 2019126179 | A | 7/2019 |
| KR | 20070005946 | A | 1/2007 |
| KR | 20090058229 | A | 6/2009 |
| KR | 20100008936 | A | 1/2010 |
| KR | 20110080590 | A | 7/2011 |
| KR | 20110082494 | A | 7/2011 |
| KR | 20130104764 | A | 9/2013 |
| KR | 1020130135805 | A | 11/2013 |
| KR | 20140014787 | A | 2/2014 |
| KR | 101428042 | B1 | 8/2014 |
| KR | 101477178 | B1 | 12/2014 |
| KR | 20140144126 | A | 12/2014 |
| KR | 20150118012 | A | 10/2015 |
| KR | 20170105236 | A | 9/2017 |
| KR | 20180120894 | A | 11/2018 |
| KR | 20130085116 | A | 6/2019 |
| TW | 1407177 | B | 9/2013 |
| WO | 2000027131 | A2 | 5/2000 |
| WO | 2004084542 | A1 | 9/2004 |
| WO | 2006008805 | A1 | 1/2006 |
| WO | 2010122841 | A1 | 10/2010 |
| WO | 2014072818 | A2 | 5/2014 |
| WO | 2017025822 | A1 | 2/2017 |
| WO | 2017037688 | A1 | 3/2017 |
| WO | 2018130898 | A1 | 7/2018 |

OTHER PUBLICATIONS

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: Eurographics, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Zitova Bet al: "Image Registration Methods: a Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: 10_i0i6/ S0262-8856(03)00137-9.

* cited by examiner

FOLDED CAMERA STRUCTURE WITH AN EXTENDED LIGHT- FOLDING-ELEMENT SCANNING RANGE

CROSS REFERENCE TO RELATED APPLICATIONS

This is a continuation application of U.S. patent application Ser. No. 17/971,565 filed Oct. 22, 2022 (now allowed), which is a continuation application of U.S. patent application Ser. No. 16/064,114 filed Jun. 20, 2018 (now U.S. Pat. No. 11,531,209), which is a 371 application from international patent application PCT/IB2017/057706 with international filing date of Dec. 6, 2017, which claims the benefit of priority of U.S. Provisional Patent Application No. 62/439,518, filed Dec. 28, 2016, all of which are incorporated herein by reference in their entirety.

FIELD

Embodiments disclosed herein relate in general to digital cameras and in particular to thin multi-aperture zoom digital cameras.

BACKGROUND

Personal electronic devices such as smartphones having two back cameras (also referred to as "dual-cameras" or "dual-aperture cameras") are known and available commercially. The two back cameras have respective lenses with different fixed focal lengths and respective image sensors (or simply "sensors") operated to capture image data (or "image"). Even though each lens/sensor combination is aligned to look in the same direction, each will capture an image of the same scene with a different field of view (FOV).

A Tele camera with adjustable $FOV_T$ for maximizing zooming capabilities is disclosed for example in commonly owned and invented PCT patent application PCT/IB2016/057366 titled "Dual-aperture zoom digital camera with automatic adjustable tele field of view". The adjustable FOV involves scanning enabled by a step motor. Recently, step motors have been replaced by voice coil motor (VCM) technology. VCM actuation is used for autofocus (AF) and/or optical image stabilization (OIS). However, known VCM actuator technology, in particular as used in folded cameras, may have a limited scanning range and a given VCM actuator may perform only OIS, which requires motion compensation in a very limited range.

Systems that rotate an OPFE for OIS are described for example in co-assigned international patent application PCT/IB2016/052179, titled "Auto focus and optical image stabilization in a compact folded camera".

Therefore, there is a need for, and it would be advantageous to have a VCM actuation mechanism for adjustable $FOV_T$ with extended scanning range. In addition, it would be advantageous to have a VCM actuation mechanism for adjustable $FOV_T$ with extended scanning range that can simultaneously support scanning in an extended range and OIS.

SUMMARY

Embodiments disclosed herein relate to VCM actuators for Tele folded cameras with adjustable $FOV_T$, such as the camera described in PCT/IB2016/057366. The disclosed actuators are designed to maximize zooming and scanning capabilities. Some exemplary disclosed embodiments also allow OIS in parallel with image scanning.

In an exemplary embodiment, there is provided an actuator for rotating an OPFE over a scanning range in which OPFE position is controlled by a non-accurate position sensing mechanism that determines an allowable jitter limit, the actuator comprising: an actuated sub-assembly rigidly coupled to the OPFE and having two hinges that define a rotation axis, and a stationary sub-assembly having two housings, wherein each housing is nested in a respective hinge of the stationary sub-assembly to form a housing-hinge pair, wherein a center-of-mass of the actuated sub-assembly is positioned to coincide with the rotation axis to limit jitter arising from the OPFE being rotated to and stopped at a given OPFE position to be no larger than an allowable limit.

In an embodiment, each housing-hinge pair has a degree of friction designed to assist in limiting the jitter arising from the OPFE being rotated to and stopped at a given OPFE position to be no larger than the allowable limit.

In an embodiment, the stationary sub-assembly includes a position sensor for sensing the given OPFE position.

In an embodiment, the position sensor includes a Hall bar sensing element.

In an embodiment, the scanning range is larger than ±1.5 degrees around a rest position of the OPFE.

In an embodiment, the scanning range is at least ±5 degrees around the rest position of the OPFE.

In an embodiment, the scanning range is up to ±20 degrees around the rest position of the OPFE.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

DETAILED DESCRIPTION

Figure 1A:
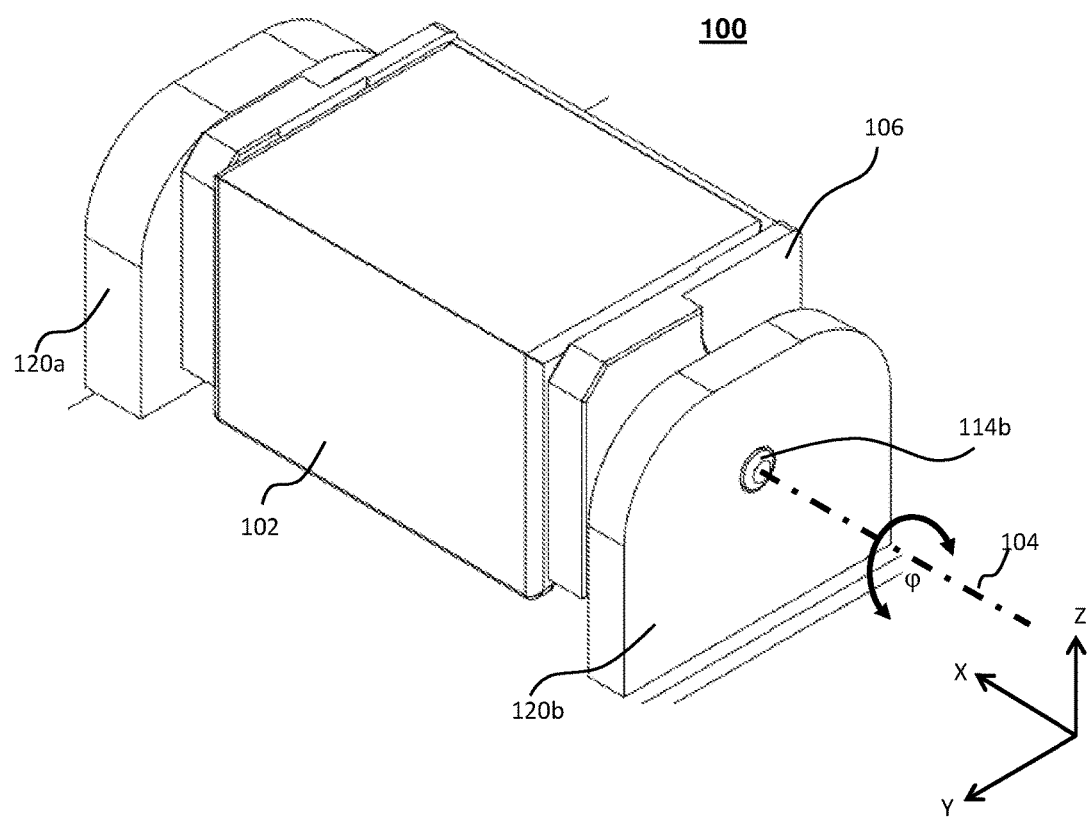
FIG. 1A shows an actuator capable of extended scan in an isometric view according to an exemplary embodiment.
Figure 1B:
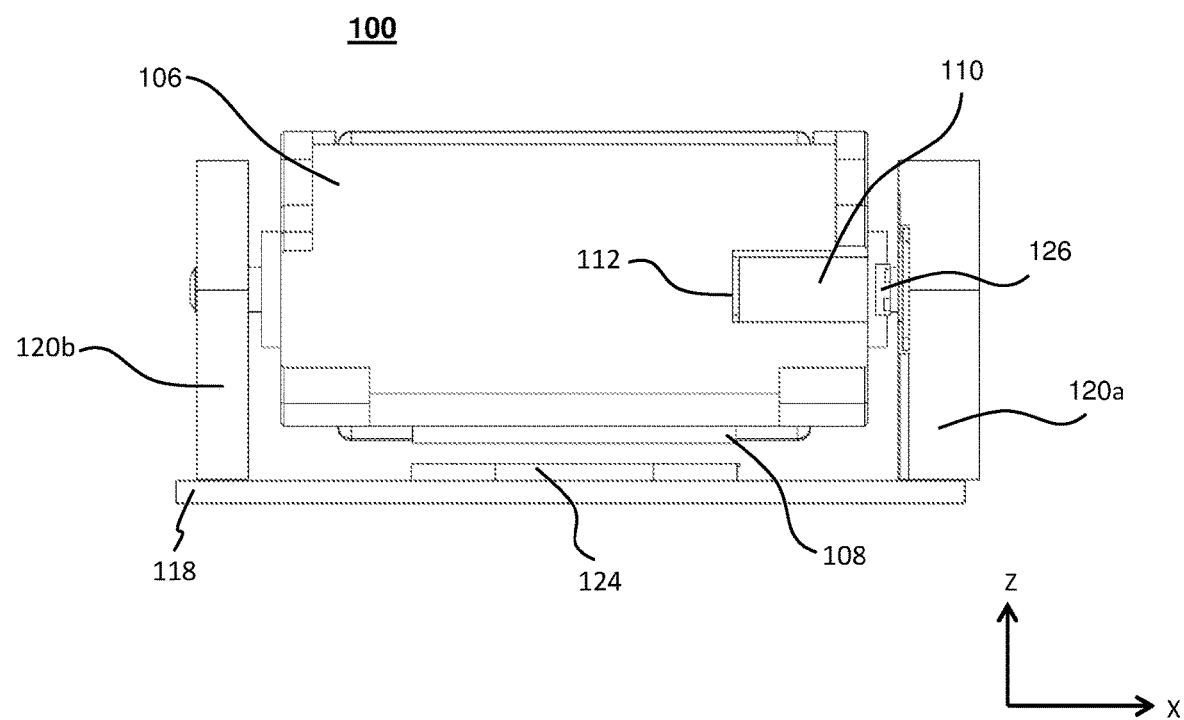
FIG. 1B shows the actuator of FIG. 1A in a backside view.
Figure 1C:
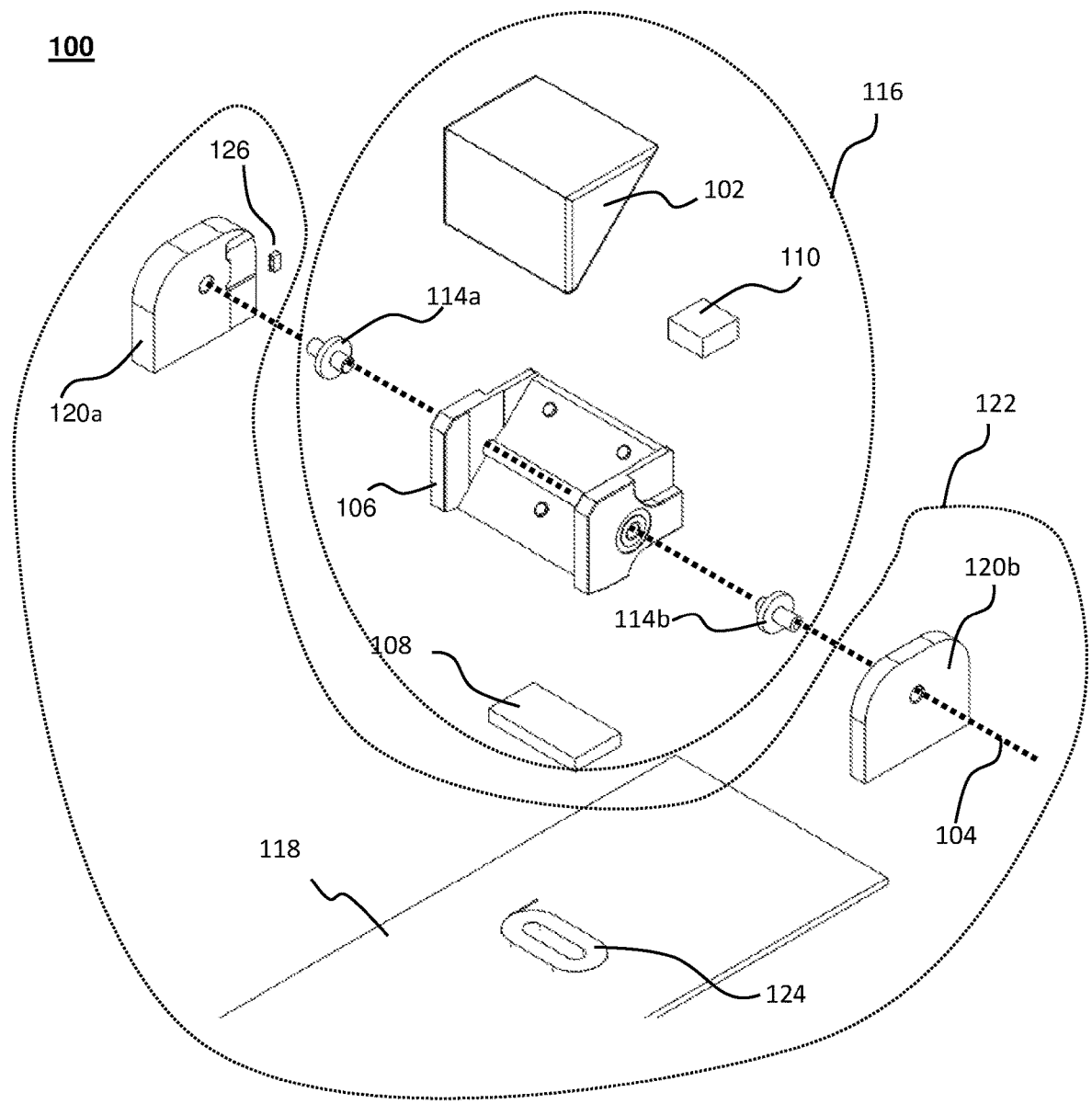
FIG. 1C shows the actuator of FIG. 1A in an exploded view.

FIGS. 1A-D illustrate in various views an actuator 100 of a rotational voice coil motor (VCM), according to an example of the presently disclosed subject matter. Actuator 100 enables an extended OPFE scanning range relative to the needs of other systems that rotate an OPFE for OIS (where the rotation is typically of ±1 degree, as e.g. the system described in co-assigned PCT patent application PCT/IB2016/052179) and enables as well adjustment of $FOV_T$. FIG. 1A shows actuator 100 in an isometric view, FIG. 1B shows actuator 100 from a back view, and FIG. 1C shows actuator 100 in an exploded view. Actuator 100 enables rotation (in an angle referred to as "φ") of an OPFE 102 (for example a prism or mirror) around a single axis 104 (i.e. around for example the X axis in the coordinate system shown and used in all figures), as described below. Axis 104 may also be referred to as "rotation axis". In various embodiments, the extended range of φ may be for example in the range of 10 degrees to 40 degrees (or ±5 degrees to ±20 degrees around an initial "rest" position). In an exemplary embodiment, φ=20 degrees or ±10 degrees around the rest position In comparison, known designs in which the OPFE is rotated (tilted) for OIS purposes only enable a limited rotation range of 0.5 to 3 degrees or ±0.25 to ±1.5 degrees around the rest position.

In actuator 100, OPFE 102 is held in an optical element holder (or simply "holder") 106, which may be made, for example by plastic molding, fit to the shape of OPFE 102. An actuation magnet 108 is fixedly attached (e.g. glued) to optical element holder 106 from below (negative Z direction in FIG. 1B). A sensing magnet 110 is fixedly attached (e.g. glued) to holder 106 on one side of the holder in a groove 112. Two hinges 114a and 114b are fixedly attached (e.g. glued) to holder 106 on two sides. Hinges 114a and 114b are made for example of a hard metal, e.g. stainless steel. The assembly of OPFE 102, optical element holder 106, actuation magnet 108, sensing magnet 110, and hinges 114a and 114b will be referred to henceforth as "actuated sub-assembly" 116.

Actuator 100 further includes a base 118, made for example of plastic, and two housings 120a and 120b also made for example of plastic, housings 120a and 120b fixedly attached (e.g. glued) to base 118. Is some embodiments, base 118 and either one or both of housings 120a and 120b may be molded as a single part. In some embodiments, housing 120a and/or housing 120b may include several parts which are assembled and e.g. glued only during the actuator assembly process. Base 118 and housings 120a and 120b form a "stationary sub-assembly" 122. Stationary sub-assembly 122 further includes a Hall bar sensing element 126 and a coil 124, both described below.

Actuated sub-assembly 116 is positioned inside stationary sub-assembly 122 such that hinges 114a and 114b are positioned inside housings 120a and 120b respectively. Hinges 114a and 114b are concentric and lie on axis 104 (parallel to the X axis in the figures). The mechanical structure described allows the rotation of actuated sub-assembly 116 and of OPFE 102 around axis 104. The plastic moldings of base 118 and/or optical element holder 106 may be used as a mechanical stopper for actuated sub-assembly 116 to prevent motion beyond φ degrees.

In some embodiments, axis 104 is positioned through the center-of-mass of actuated sub-assembly 116. The "mass" includes elements 102, 106, 108, 110, 114a and 114b. In such embodiments, an external rotation of actuator 100 (caused e.g. by a user rotating a device including the actuator) will not cause a relative rotation between actuated sub-assembly 116 and stationary sub-assembly 122.

Actuator 100 further includes a wound coil 124, for example of a stadium shape, typically with a few tens of windings (e.g. in a not limiting range of 50-250) and with a typical resistance of 10-30 ohm. Coil 124 is located below magnet 108 such that nominally their centers overlap when the actuated sub-assembly is at rest. Magnet 108 can be for example a permanent magnet, made from a neodymium alloy (e.g. $Nd_2Fe_{14}B$) or a samarium-cobalt alloy (e.g. $SmCo_5$). Magnet 108 can be fabricated (e.g. sintered) such that it changes the magnetic poles direction: on the positive Y side, the North magnetic pole faces the negative Z direction, while on the negative Y side, the North magnetic pole faces the positive Z direction. Coil 124 is connected to external current driving circuit (not shown), the driving circuit capable of sending input currents to coil 124. Current in coil 124 creates a Lorentz force due to the magnetic field of magnet 108: for example, a current in a clockwise direction will create a force in the positive Y direction, while a current in counterclockwise direction will create a force in the negative Y direction. The full magnetic scheme (i.e. the full magnetic simulation of the magnetic field caused by magnet 108) is known in the art, and described, for example, in detail in patent application PCT/IB2016/052179.

When the magnetic force applied by coil 124 is in the positive and negative Y directions, the hinge mechanical structure confines actuated sub-assembly 116 to rotate around axis 104. A Hall bar element 126 can sense the intensity and direction of the magnetic field of sensing magnet 110. Sensing magnet 110 can be for example a permanent magnet, made from a neodymium alloy (e.g. $Nd_2Fe_{14}B$) or a samarium-cobalt alloy (e.g. $SmCo_5$). Magnet 110 can be fabricated (e.g. sintered), such that its North pole is to the Z direction when actuator 100 is at rest. Upon actuation, the relative position of actuated sub-assembly 116 and Hall bar element 126 is changed. The intensity and direction of the magnetic field senses by Hall bar element 126 changes as well, and thus the position of actuated sub-assembly 116 can be determined. A closed loop control circuit (not shown) is used to control the position of the actuated sub-assembly and set to the position required by optical demands. The closed loop control circuit has a single input—the signal of Hall bar element 126, and a single output—the amount of current applied in coil 124. The closed loop control circuit may be implemented in an integrated circuit (IC) (not shown). Operation of a closed loop control system with single input and single output (SISO) system is known in the art. Such a closed loop control circuit may, for example, be a linear "proportional-integral-differential" (PID) control. In some embodiments, the single IC may be implemented in a controller inside Hall bar element 126. In other embodiments, the IC may be a separate chip, which can be located externally to the camera.

The step resolution and jitter (noise) of actuator 100, as described below, may be limited by a "non-accurate" sensing mechanism circuitry to $1/1000$ of φ. For usage requirements, a $1/80$ of φ step resolution may be acceptable, as described in PCT patent application PCT/IB2016/057366. However, after actuator 100 has positioned the OPFE in a specific position, considerations of prevention of image blur require a jitter of no more than $1/200$ degree. In system 100 and for example, $1/200$ degree is equal to $1/4000$ of φ, which is smaller than the $1/1000$ φ jitter limit allowed by the sensing circuitry. To address this problem, a friction-based mechanism is provided to limit jitter to a level that does not exceed the allowable limit (1/200 degree, which in the example is 1/4000 of φ). For example, in some cases, significant friction may be designed and introduced between hinges 114a and 114b and housings 120a and 120b. After a control command moves (through a driving current, see below) actuated sub-assembly 116 to a desired position, as required by optical demands and as sensed by a sensing mechanism described below, the driving current may be turned off to reduce jitter caused by a non-accurate sensing mechanism. The significant friction and the positioning of axis 104 through the center-of-mass of actuated sub-assembly 116 will ensure that external torques and forces (caused for example by user hand shake) will maintain actuated sub-assembly 116 fixed relative to stationary sub-assembly 122. The power turn-off also helps reduce the system power consumption.

For example, assume actuated sub-assembly with a mass of 500 mg and a moment of inertia around axis 104 of 1000 mg-mm$^2$. Assume a friction coefficient of 0.7 between stainless steel hinges 114a-b and plastic housings 120a-b. Axis 104 with a diameter of 0.7 mm is nominally designed to pass through the center-of-mass of actuated sub-assembly 106. However due to mechanical tolerances during assembly, axis 104 may shift by up to 20 micrometers (μm), which will cause a gravity torque of up to 0.0001 N-mm. Typical handshakes are up to 2 Hz and 0.1 degrees, causing angular accelerations of up to 0.3 rad/sec$^2$, and moment of inertia-provided torques are typically limited to 0.0003 N-mm. Thus, both gravity and handshake torques will not overcome a friction torque (mass×friction coefficient×hinge radius) of 0.001225 N-mm after current turn off.

Figure 2:
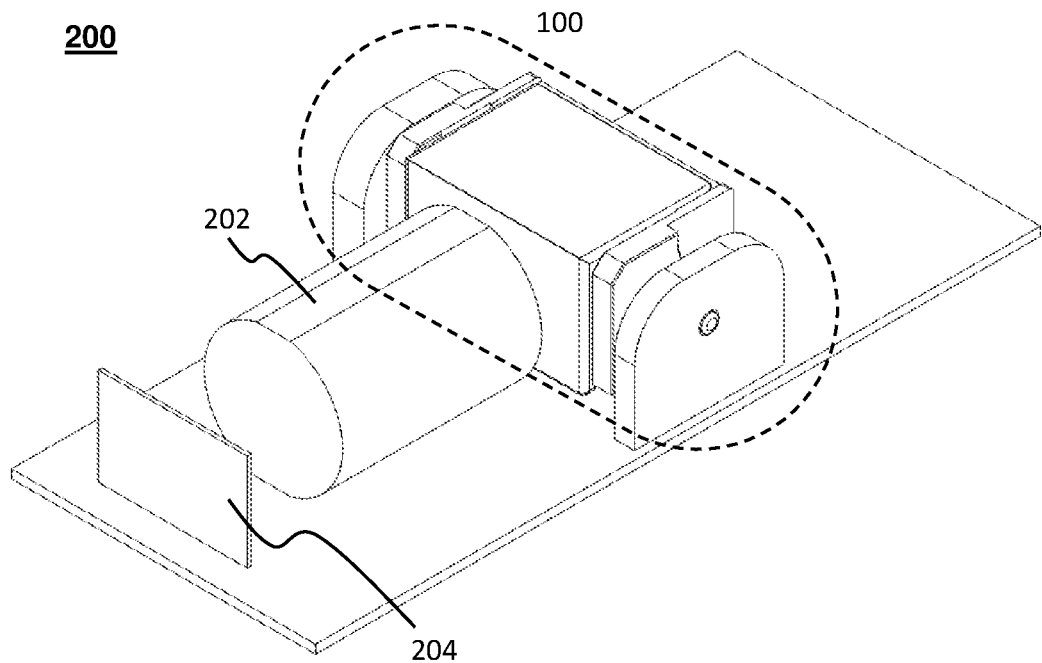
FIG. 2 shows the actuator of FIGS. 1A-C in a folded camera with lens and sensor.

FIG. 2 shows actuator 100 as part of folded camera structure (FCS) or simply "folded camera" 200. In folded camera 200, actuator 100 is used to rotate OPFE (e.g. prism) 102. The operation (actuation) of actuator 100 in folded camera 200 creates an extended tele field of view (FOV$_T$), of the type described for example in U.S. provisional patent applications 62/272,367 and 62/361,150. A typical rotational actuation stroke of actuator 100 in this case may be in the range of ±5 to ±20 degrees of the original position of OPFE 102, with resolution of at least 8 and up to 100 distinguishable steps (possible OPFE positions). Camera 200 further includes a lens element 202, and an image sensor 204. Camera 200 may further include an actuation mechanism for focusing and/or auto-focus (AF) of lens element 202. This actuation mechanism is not shown in FIG. 2, but may be for example as described in U.S. Pat. No. 9,392,188.

Figure 3:
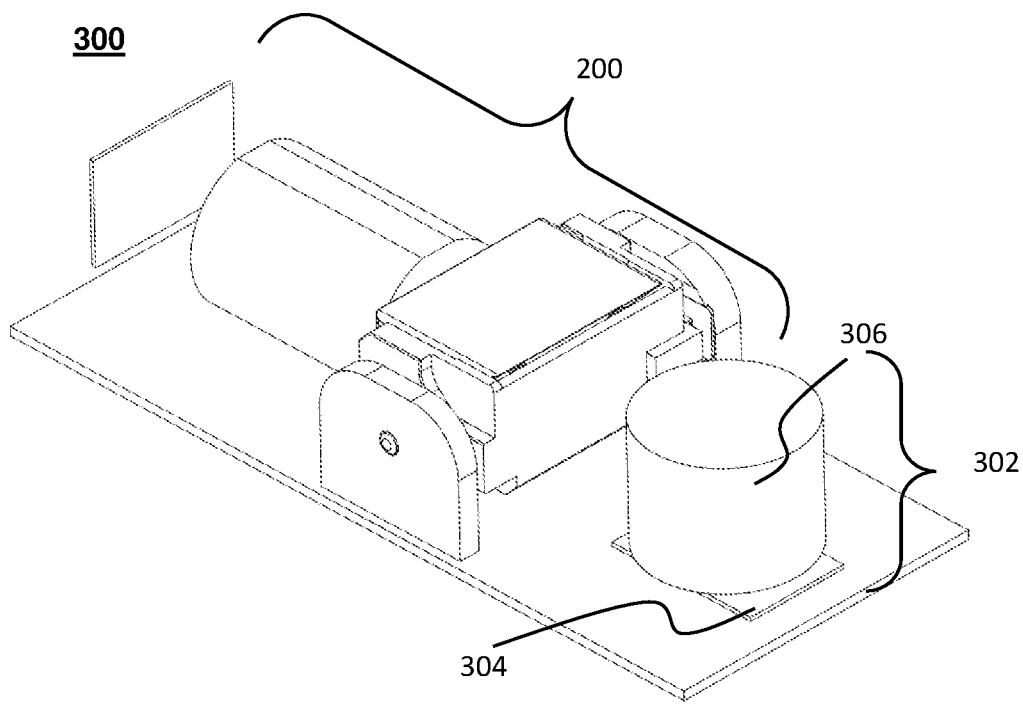
FIG. 3 shows the folded camera and actuator of FIG. 2 in a dual-camera.

FIG. 3 shows folded camera 200 a part of a dual-camera (or "dual-aperture camera") 300. Dual-camera 300 also includes a standard "upright" camera 302. Camera 302 has a standard camera structure, known in the art, and includes a lens 304 and an image sensor 306. Camera 302 may also include other parts such as actuation mechanism for the lens, a mechanical shield, a chassis and other parts, all known in the art and not shown in FIG. 3. Dual-aperture cameras such as camera 300 and their operation and use are described in detail in, for example, international patent application PCT/IB2016/056060.

Magnetic sensing element 126 is for example (as mentioned above) a Hall bar element, capable of measuring magnetic field in the X direction indicated in FIG. 1. In actuator 100, magnet 110 is rigidly coupled to (or is part of) actuated sub-assembly 116, while sensing element 126 is rigidly coupled to (or is part of) stationary sub-assembly 122. Magnet 110 has for example a magnetic field direction along the Z axis, such that the North magnetic pole is on the positive Z direction and the South magnetic pole is in the negative Z direction.

Figure 4:
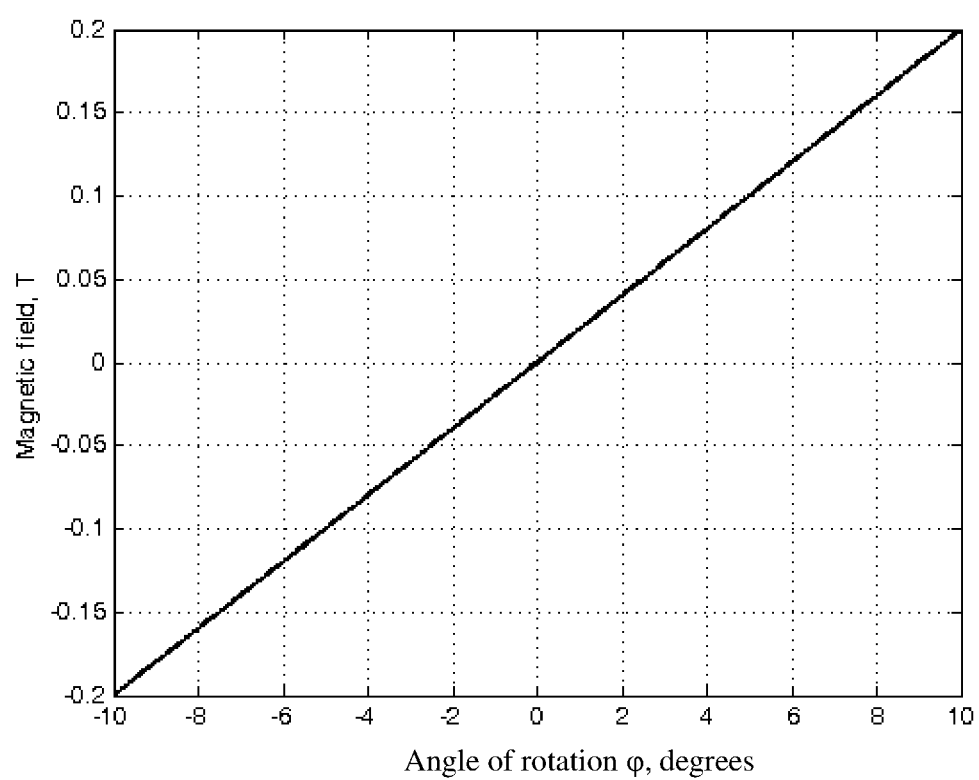
FIG. 4 shows a simulation of the effect of a magnetic field in the X direction on a sensing element as function of actuated sub-assembly 116 and magnet 110) rotating around axis 104.

FIG. 4 shows a simulation of the effect of the magnetic field in the X direction on sensing element 126 as function of actuated sub-assembly 116 (and magnet 110) rotating around axis 104. It is apparent that the magnetic field changes monotonically from a negative value of about −0.2 T at one end of the movement range to +0.2 T at the other end of the movement (rotation) range.

Figure 5:
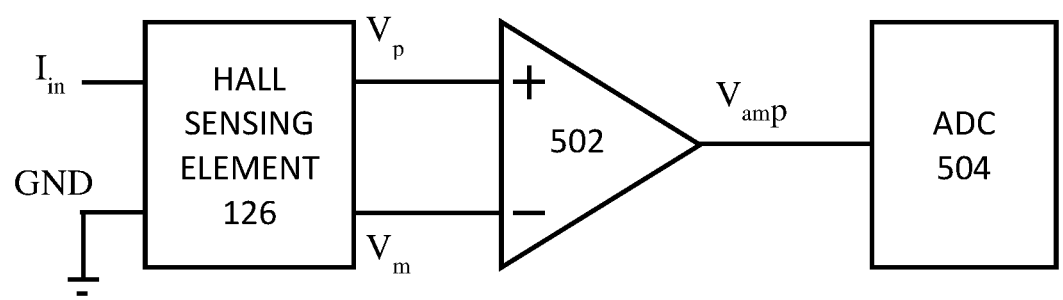
FIG. 5 shows schematically a sensing circuit for the actuator of FIGS. 1A-C.

FIG. 5 shows a known art electrical circuit 500 which allows reading of the magnetic field by a Hall bar element 126. Hall bar element 126 has 4 connectors marked as Iin, Gnd, V+ and V−. A current typically in the range of 1-20 mA is driven in Iin and flows through Hall bar element 126 to the ground (GND). Hall bar element 126 has a typical resistance in the range of 200-3000 KΩ. In this example, consider a sensing element with resistance 1200 ohm and current Iin=2.5 mA, such that the voltage drop between Iin and Gnd is 3V and is marked as Vin=3V. For the case of 0 (zero) magnetic field B in the X direction Vp=Vm=Vin/2=1.5V. If a magnetic field exists in Hall bar element 126, a voltage drop will be created between Vp and Vm, marked as Vout=Vp−Vm, such that Vp=(Vin+Vout)/2 and Vm=(Vin−Vout)/2. The size of Vout is proportional to the magnetic field B on the sensing element, i.e. Vout=αB. For a constant current Iin=2.5 mA, α has a typical value in the range of 0.2-2 mV/mT. In this example, consider α=0.5 mV/mT, such that for the graph seen in FIG. 4B, Vout is in the range of −100 mV to 100 mV in the movement range.

Amplifier 502 is an operational amplifier (op-amp) with a 3V driving voltage. The details of operation of op-amp 502 are known in the art and described here briefly. Op-amp 502 has an amplification factor β in the range of 5-200. In this example, assume an amplification factor of β=15. The inputs of op-amp 502 are Vp and Vm. The output of op-amp 502 is Vp+β(Vp−Vm). Hence, the voltage output of op-amp 502 (Vamp) in this example is in the range of 0-3V. Vamp is sampled by an analog-to-digital converter (ADC) 504, with resolution in the range of 8-14 bits, in this example 12 bits. Namely, the range 0 to 3V is divided to 4096 levels. Thus, circuit 500 allows the measurement of the motion range of actuator 100 with 12 bit maximal resolution (or 8-16 bits in other cases). For a 20 degree scanning range, this allows approximately 0.005 degree resolution. This resolution is worse than required.

Figure 6A:
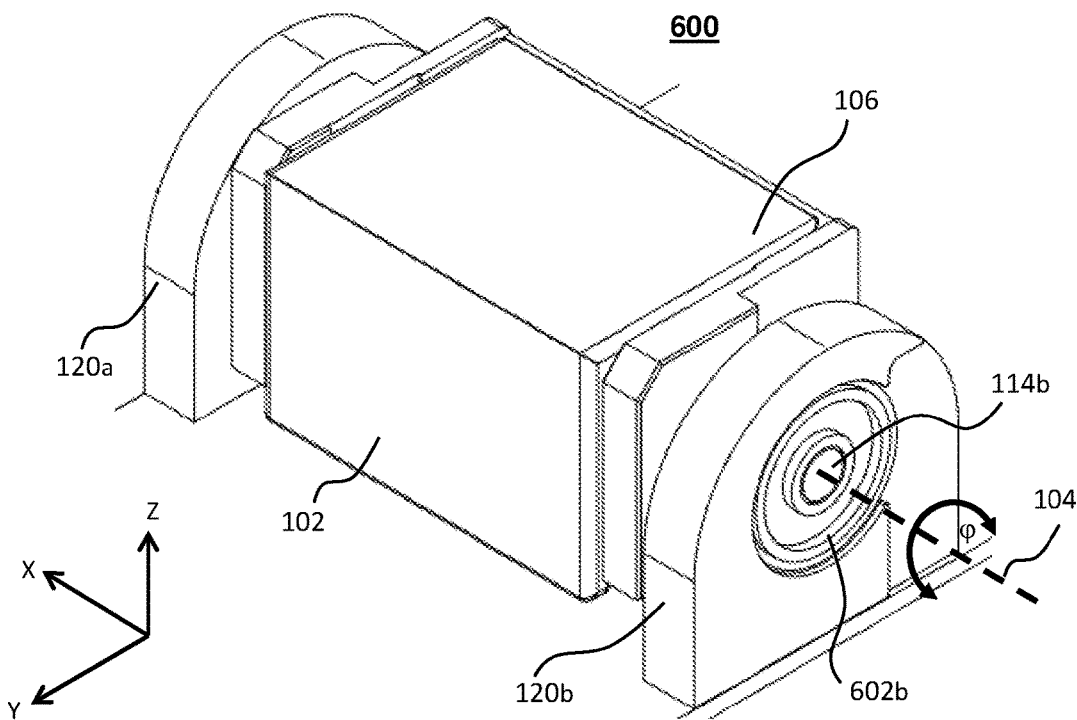
FIG. 6A shows an actuator capable of extended scan+OIS in an isometric view according to another exemplary embodiment.
Figure 6B:
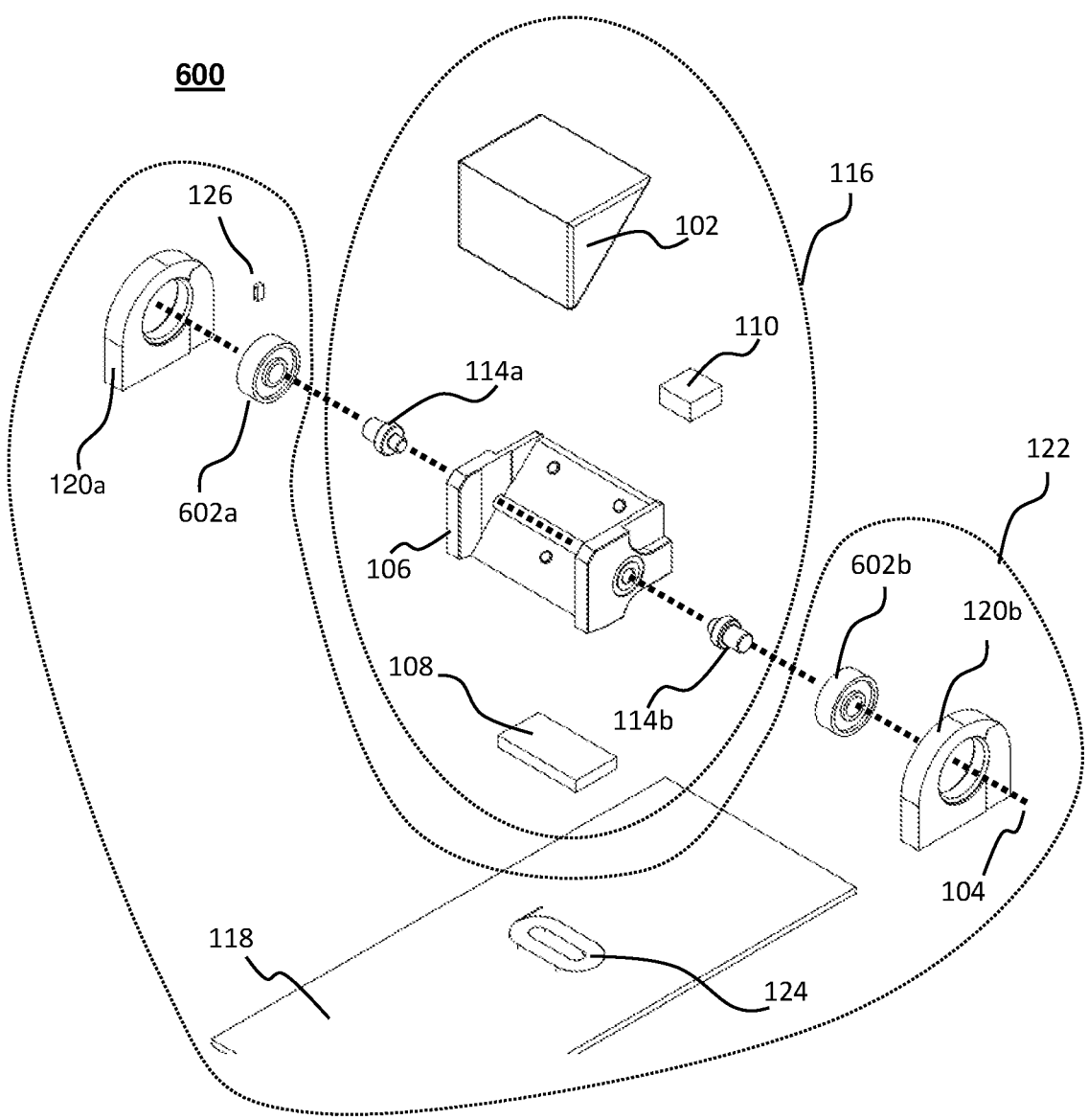
FIG. 6B shows the actuator of FIG. 6 in an exploded view.

FIG. 6A illustrates in an isomeric view, and FIG. 6B illustrates in an exploded view an actuator 600 of a rotational VCM according to another exemplary embodiment disclosed herein. Actuator 600 allows an extended OPFE scanning range plus OIS abilities. Compared to actuator 100, actuator 600 has an accurate position sensing mechanism that allows accuracy of 1/200 degrees, as described below. Thus, the control circuitry of actuator 600 can remain operative while the OPFE is rotated to a desired portion without reducing image optical quality.

Actuator 600 is similar mechanically to actuator 100 and includes all elements as actuator 100 (which consequently are numbered with identical numbers). The difference between actuator 600 and actuator 100 is that actuator 600 further includes two ball bearings 602a and 602b, typically made of stainless steel. Ball bearings 602a and 602b are fixedly attached (e.g. glued) inside housings 120a and 120b respectively. Actuated sub-assembly 116 is positioned inside stationary sub-assembly 122 such that hinges 114a and 114b are positioned inside ball bearings 602a and 602b respectively. Hinges 114a and 114b and bearings 602a and 602b are all concentric and lie on axis 104. The mechanical structure described allows the rotation of actuated sub-assembly 116 and light-folding-element 102 around the X axis with very low friction. A typical low friction coefficient of ball bearing 602*a* and 602*b* may be in the range of 0.001-0.005.

Figure 7:
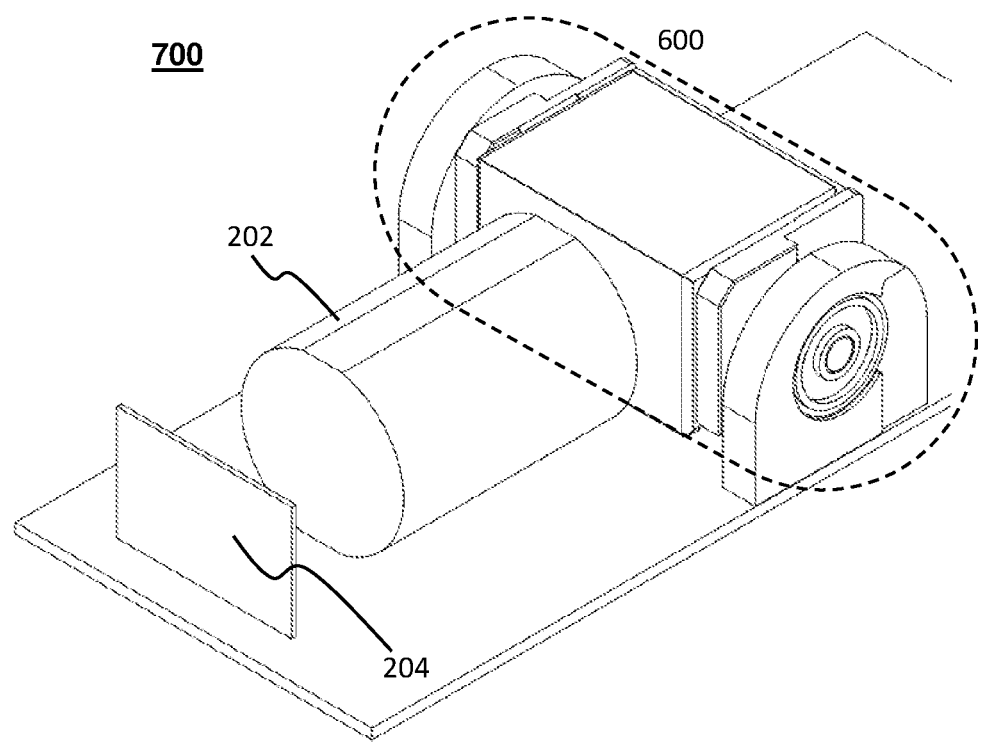
FIG. 7 shows the actuator of FIGS. 6A-C in a folded camera with lens and sensor.

FIG. 7 shows actuator 600 as part of a folded camera 700. In folded camera 700, actuator 600 is used to rotate a light folding element as described above with reference to camera 200. The actuation creates an extended zoom field of view (FOV) as mentioned above and in addition provides OIS as described for example in PCT/IB2016/052179. As also indicated above, the typical rotational actuation stroke of actuator 600 should be in the range of ±8 to ±18 degrees of the original position of the light folding element, with resolution of at least 0.002 degrees. Camera 700 may further include elements described with reference to camera 200 above.

Figure 8:
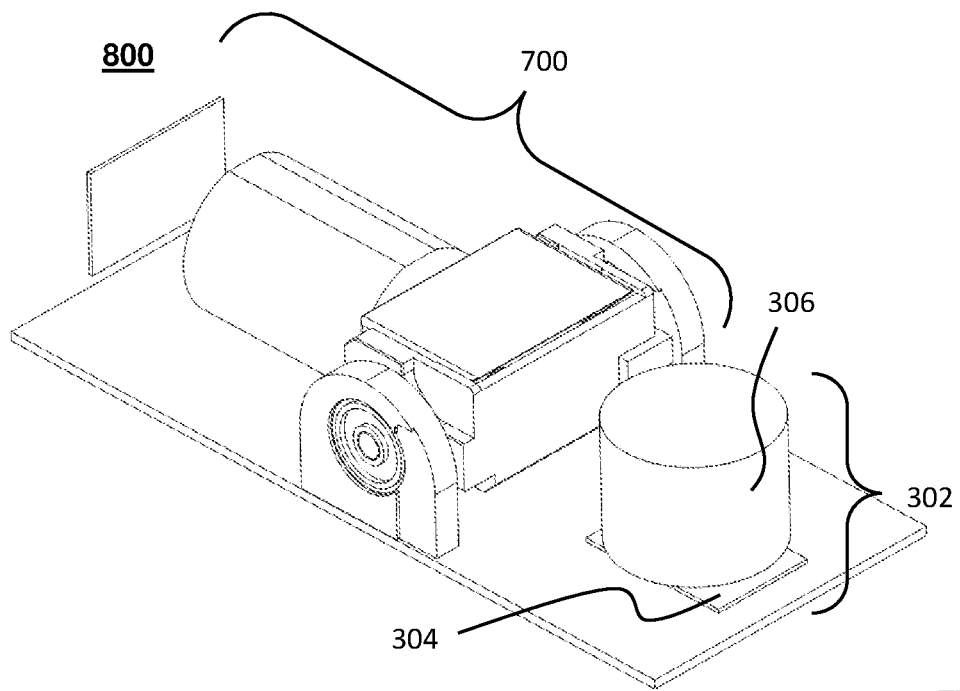
FIG. 8 shows the folded camera and actuator of FIG. 7 in a dual-camera.

FIG. 8 shows camera 700 a part of a dual-camera 800. The description and use of dual-camera 800 are similar to those in camera 300 and are therefore not repeated.

Figure 9:
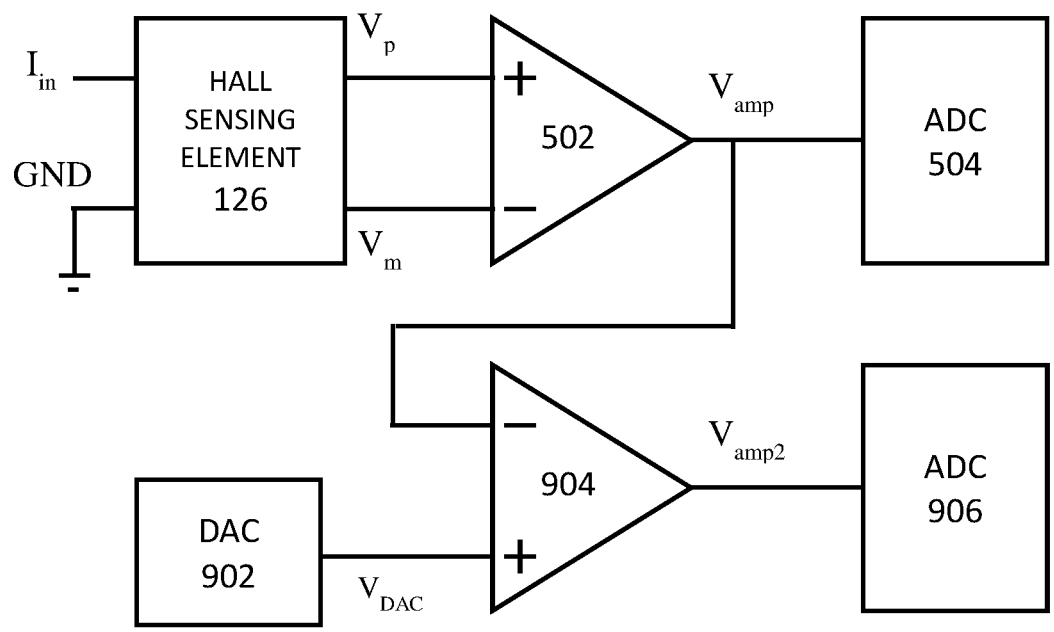
FIG. 9 shows schematically a sensing circuit for the actuator of FIGS. 6A-C.

In actuator 600, the actuation mechanism is responsible for both an extended scanning range and OIS. Thus, a higher scanning resolution is required, relative to that in actuator 100. FIG. 9 shows an electrical circuit 900 which allows reading of the magnetic field by Hall bar sensing element 126 for the extended scanning, according to an exemplary embodiment disclosed herein. Circuit 900 extends circuit 500 by including, in addition to the elements of circuit 500, a digital-to-analog converter (DAC) 902 with resolution in the range of 8-14 bits, and in this example 12 bits. Namely, the range 0 to 3V is divided to 4096 levels, or less than 1 mV. DAC 902 provides a reference voltage for a second amplification step, as explained next. The analog output of DAC 902 is marked as Vdac. Circuit 900 further includes op-amp 904, operating under voltage of 3V and amplification $\gamma$ in the range of 100-4000. Exemplary, op-amp 904 demonstrates amplification of $\gamma=500$. The inputs of op-amp 904 are Vamp and Vdac. The output of op-amp 904 is Vdac+$\gamma$ (Vdac−Vamp). Vdac is set in the following manner: the tilt (rotation) target of actuator 600 is known (decided by the user). The target range $\varphi$ is divided into S steps, S is an integer, S>$\gamma$, in this example S=3000 (0.2 degrees in this example). For a given tilt target, a value "s" marks the closest integer step in the range. For example, if the target is −5 degrees than s=750. The DAC output is set to Vin/2−Vrange/2+Vrange*s/S. This setting of DAC output can assure that when the position of the actuator is closer to the target than $\varphi$/S the output of op-amp 502, Vamp2 is in the range of 0-3V. Vamp2 is sampled by an ADC 906, with resolution in the range of 8-14 bits, and in this example 12 bits. Namely, the range 0 to 3V is divided to 4096 levels. Thus, circuit 900 allows the measurement of the motion range of actuator 100 with $\gamma$ times precision more than circuit 500. For 20 degrees scanning range, with $\gamma=500$, this allows approximately 0.00001 degree (10 micro-degree) resolution.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A folded digital camera, comprising:
   an optical path folding element (OPFE) for folding an optical path from an imaged object or scene toward a lens and an image sensor of the folded digital camera, the folded digital camera having a field of view (FOV); and
   a single actuator including a single coil and single magnet for rotating the OPFE for optical image stabilization (OIS), wherein the rotation of the OPFE enables adjustment of the FOV over an extended scanning range greater than +1.5 degrees and wherein OIS is enabled over the extended scanning range with sufficient resolution by a friction-based mechanism.

2. The folded digital camera of claim 1, wherein the sufficient resolution is at least 0.002 degrees.

3. The folded digital camera of claim 1, wherein the sufficient resolution is at least 0.005 degrees.

4. The folded digital camera of claim 1, wherein the extended scanning range is up to ±5 degrees around a rest position of the OPFE.

5. The folded digital camera of claim 1, wherein the extended scanning range is up to ±8 degrees around a rest position of the OPFE.

6. The folded digital camera of claim 1, wherein the extended scanning range is up to ±20 degrees around a rest position of the OPFE.

7. The folded digital camera of any of claim 1, wherein the single actuator includes a position sensor for sensing an OPFE position relative to a stationary base of the folded digital camera.

8. The folded digital camera of claim 7, wherein the position sensor includes a Hall bar sensor.

9. The folded digital camera of claim 1, wherein the single coil and the single magnet form a rotational voice coil motor (VCM) for rotating the OPFE.

10. The folded digital camera of claim 7, wherein the single magnet is mechanically coupled to the OPFE and wherein the single coil is coupled to the stationary base.

11. The folded digital camera of claim 1, wherein the folded digital camera is included in a smartphone.

12. A method, comprising:
    providing a folded digital camera having an optical path folding element (OPFE) for folding an optical path from an imaged object or scene toward a lens and an image sensor of the folded digital camera, the folded digital camera having a field of view (FOV); and
    rotating the OPFE with a single actuator including a single coil and single magnet to enable optical image stabilization (OIS), wherein the rotation of the OPFE enables adjustment of the FOV over an extended scanning range greater than ±1.5 degrees and wherein OIS is enabled over the extended scanning range with sufficient resolution by a friction-based mechanism.

13. The method of claim 12, wherein the sufficient resolution is at least 0.002 degrees.

14. The method of claim 12, wherein the sufficient resolution is at least 0.005 degrees.

15. The method of claim 12, wherein the extended scanning range is up to +5 degrees around a rest position of the OPFE.

16. The method of claim 12, wherein the extended scanning range is up to +8 degrees around a rest position of the OPFE.

17. The method of any of the claim 12, wherein the extended scanning range is up to ±20 degrees around a rest position of the OPFE.

18. The method of claim 12, wherein the single actuator includes a position sensor for sensing an OPFE position relative to a stationary base of the folded digital camera.

19. The method of claim 18, wherein the single magnet is mechanically coupled to the OPFE and wherein the single coil is coupled to the stationary base.

20. The method of claim 12, wherein the single coil and the single magnet form a rotational voice coil motor (VCM) for rotating the OPFE.

21. The method of claim 12, further comprising including the folded digital camera in a smartphone.

\* \* \* \* \*